United States Patent [19]

Yamada et al.

[11] Patent Number: 5,623,224
[45] Date of Patent: Apr. 22, 1997

[54] COMMUNICATION CIRCUIT WITH VOLTAGE DROP CIRCUIT AND LOW VOLTAGE DRIVE CIRCUIT

[75] Inventors: Takaaki Yamada; Yasushi Nakamoto, both of Kanagawa, Japan

[73] Assignee: Sony Corporation, Japan

[21] Appl. No.: 524,118

[22] Filed: Aug. 24, 1995

Related U.S. Application Data

[63] Continuation of Ser. No. 227,463, Apr. 14, 1994, abandoned.

[30] Foreign Application Priority Data

Apr. 30, 1993 [JP] Japan ..................... 5-104672
Apr. 30, 1993 [JP] Japan ..................... 5-104767

[51] Int. Cl.$^6$ ..................... G05F 3/24; G05F 1/56
[52] U.S. Cl. ........... 327/333; 331/111; 331/143; 331/185; 323/313; 323/314; 365/226; 327/108; 327/538
[58] Field of Search ..................... 363/62; 323/313, 323/314, 316, 317, 281; 235/492, 491; 365/226, 227, 189.09; 331/111, 143, 116 R, 160, 185, 186; 327/108, 538, 539, 540, 541, 542, 543, 333

[56] References Cited

U.S. PATENT DOCUMENTS 4,128,816  12/1978  Shimotsuma .............. 331/116 R
4,618,837  10/1986  Matsuura .................... 331/160
5,124,631   6/1992  Terashima .................. 323/313
5,197,033   3/1993  Watanabe et al. ........ 365/226

FOREIGN PATENT DOCUMENTS 0077212   5/1985  Japan ..................... 323/313

Primary Examiner—Robert Pascal
Assistant Examiner—Arnold Kinkead
Attorney, Agent, or Firm—Ronald P. Kananen

[57] ABSTRACT

A communication circuit system of an IC card etc. including a voltage drop circuit having a complementary type transistor circuit comprising a p-channel and an n-channel transistor connected together, the circuit being connected to a power source voltage and generating a voltage corresponding to the sum of the threshold voltages of the p-channel transistor and n-channel transistor and supplying the same to a load circuit; an oscillation circuit having a complementary MOS inverter, a capacitor connected to the input side of the complementary MOS inverter, and resistance elements connected between the input and output of the complementary MOS inverter; and a wave detection circuit having a first and second MOS transistors with drains and gates connected to each other and a current source, nodes between the drains and the gates of the first and second MOS transistors being connected to the current source, the gate of the first MOS transistor being connected to a signal input line, and the current capacity of the second MOS transistor being set larger than the current capacity of the first MOS transistor.

10 Claims, 13 Drawing Sheets

WHEN NO SIGNAL IS APPLIED (V1 > V2)

WHEN RF SIGNAL IS APPLIED (V1 < V2)

FIG. 10

| Vm  [mV] | dV  [mV] |
|---|---|
| 39 | -6.2 |
| 78 | -21.4 |
| 117 | -41.2 |
| 156 | -63.0 |
| 195 | -85.9 |
| 234 | -109.4 |
| 273 | -133.2 |
| 312 | -157.3 |

FIG. 14

| $V_m$ [mV] | $\overline{I_d/I_b}$ |
|---|---|
| 19.5 | 1.06 |
| 39.0 | 1.27 |
| 49.0 | 1.43 |
| 58.5 | 1.65 |
| 68.5 | 1.93 |
| 78.0 | 2.28 |
| 97.5 | 3.29 |
| 117.0 | 4.88 |

COMMUNICATION CIRCUIT WITH VOLTAGE DROP CIRCUIT AND LOW VOLTAGE DRIVE CIRCUIT

This application is a continuation of application Ser. No. 08/227,463 filed Apr. 14, 1994 now abandoned.

BACKGROUND OF THE INVENTION

1. Field of the Invention

The present invention relates to a communication circuit system, more particularly relates to a voltage drop circuit, an oscillation circuit, and a wave detection circuit suitable for use in a non-contact type IC card etc. carrying a large-scale integrated circuit (LSI).

2. Description of the Related Art

An IC card comprises a microprocessor, that is, the central control portion and computation portion of a microcomputer, housed in an LSI, and an IC memory which are built into a single silicon substrate. It has multiple purposes and can be used for multiple functions and is difficult to steal or forge, so is expected to spread rapidly in use.

There are two types of IC cards: a contact type wherein the connection with external apparatuses is performed through electroconductive terminals provided in the card, and a non-contact type wherein the contact portion is made non-contact in type and data is communicated using electromagnetic waves, light, etc.

A contact-type IC card suffers from poor contact due to wear of the contacts, dirt, etc. and therefore an occasional inability to send or receive data. The non-contact type IC card is free from such trouble and has the advantage of enabling excellent data transmission and reception at relatively close distances.

A non-contact type IC card generally houses a battery and uses the voltage of the same to operate an oscillation circuit, control circuit, storage unit, etc. in the card. For example, it is constituted so that the control circuit outputs queried (inquiry) information etc. stored in the storage unit based on reference signals from the oscillation circuit.

As the microprocessor mounted inside an IC card, generally use is made of a low power consumption CMOS microprocessor. In recent years, however, due to the need to extend the usage life of the internal battery, it has been desired to reduce the voltage of the power source to an extremely low level. Also, due to need for competition with magnetic cards and other existing media, it has been desired to reduce costs.

As the oscillation circuit built in an IC card LSI, use is made of a CR self-oscillation circuit. In the past, this CR oscillation circuit has been designed to suppress the so-called "punch-through current" with respect to a smooth input waveform by the provision of a differential comparator at the first stage of the drive circuit. Further, it has been desired that the IC card oscillation circuit have a current consumption of at least as low as about 0.7 µA.

In general, the current consumption of a CMOS circuit is expressed by the sum of the punch-through current at the time of switching and the charging and discharging current of the load capacity, but in a conventional IC card LSI as mentioned above the reduction of the voltage of the power source has led to the problem that when a certain fixed low voltage, for example, 1.5 V, is dropped to, manufacturing variations in the threshold voltage of the MOS transistors cause a decline in the operating speed and in extreme cases the output being fixed at either of the high level or low level and thus an inability of operation.

To solve this problem, new manufacturing processes are being developed which lower the threshold voltage $V_{TH}$ and hold down the variations to smaller than in the past, but since these are advanced processes, one cannot expect to achieve the above-mentioned target of reduced costs with them.

Further, the above-mentioned conventional oscillation circuit suppresses the punch-through current by providing a differential comparator at the first stage of the drive circuit, but the differential comparator requires a direct current of about 0.1 µA for each of a bias current of the differential input portion and the bias reference generating circuit and the comparator reference voltage generating circuit, and in principle the duty ratio is not even 50 percent.

As a result, since it is necessary to cause oscillation once at twice the frequency and to divide the same, the current consumption for the oscillation circuit as a whole ends up becoming 1.5 µA, which poses a problem in use for an IC card.

Further, a non-contact IC card using electromagnetic waves performs the reading and writing of data by microwaves, so requires a circuit for detecting waves at a high sensitivity and with a low power consumption.

various circuits have been proposed for this wave detection circuit.

Among these circuits, as one which has a power consumption of less than 10 µW, there is known a diode wave detection circuit which in principle consumes no power.

The above-mentioned diode wave detection circuit, however, requires an input amplitude of the threshold voltage $V_{TH}$ of the transistor, which is, for example, at least 0.7 V, so it is difficult to detect waves with a high sensitivity.

Typically, the circuits applied to the IC card are described, however, these problems may arise such circuits applied devices other than the IC card.

SUMMARY OF THE INVENTION

An object of the present invention is to provide a voltage drop circuit which can prevent the occurrence of a punch-through current, suppress extreme speed reductions, enables a high yield even using conventional processing technology, and enables a reduction of costs.

Another object of the present invention is to provide an oscillation circuit which enables a reduction of the current consumption and realization of a 50 percent duty ratio.

Still another object of the present invention is to provide a wave detection circuit which enables wave detection with a high sensitivity and a low power consumption.

To achieve the first object, according to a first aspect of the invention, there is provided a voltage drop circuit which has a complementary type transistor comprising a p-channel transistor and an n-channel transistor connected together and connected to a power source voltage, generates a voltage corresponding to the sum of the threshold voltages of the p-channel transistor and n-channel transistor, and supplies the same to a load circuit.

According to the voltage drop circuit of the first aspect of the present invention, the power source voltage is supplied to the complementary MOS transistor and is then dropped to a voltage corresponding to the sum of the threshold voltages of the p-channel transistor and the n-channel transistor. The dropped power source voltage is then supplied to the load circuit.

According to another embodiment of the first aspect of the invention, there is provided a voltage drop circuit which has a complementary type MOS transistor comprised of a p-channel MOS transistor and an n-channel MOS transistor with drains and sources connected to each other and a differential amplifier, one of the sources of the complementary MOS transistor being connected to a power source voltage, while the other source being connected to one of the inputs of the differential amplifier, the other input of the differential amplifier being connected to the output of the same, the output of the differential amplifier being connected to a power line of a load circuit.

According to the voltage drop circuit of this other embodiment of the first aspect of the present invention, the power source voltage is supplied to the complementary MOS transistor and is subjected to a voltage drop action of an amount of voltage corresponding to the sum of the threshold voltages of the p-channel MOS transistor and the n-channel MOS transistor by the complementary MOS transistor and then is input to one input of the differential amplifier.

The output of the differential amplifier is connected to the other input. From the differential amplifier, therefore, a signal corresponding to the level of the power source voltage minus the amount of voltage corresponding to the sum of the threshold voltages of the p-channel MOS transistor and the n-channel MOS transistor is output to the load circuit.

To achieve the second object, according to a second aspect of the invention, there is provided an oscillation circuit which has a complementary MOS inverter, a capacitor connected to the input side of the complementary MOS inverter, and resistance elements connected between the input and output of the complementary MOS inverter.

The oscillation circuit of the second aspect of the present invention preferably is provided in a load circuit connected to the output of the voltage drop circuit set forth above and operates by a voltage corresponding to the sum of the threshold voltages of the p-channel transistor and the n-channel transistor.

The oscillation circuit of the second aspect of the present invention preferably has a channel ratio of the p-channel and n-channel transistors constituting the complementary MOS inverter set to a predetermined value.

The oscillation circuit of the second aspect of the present invention therefore functions as an inverter type CR oscillation circuit which operates by a voltage corresponding to the sum of the threshold voltages of the p-channel transistor and the n-channel transistor.

To achieve the third object of the present invention, according to a third aspect of the present invention, there is provided a wave detection circuit provided with first and second MOS transistors with drains and gates connected to each other and a current source, the nodes between the drains and the gates of the first and second MOS transistors being connected to the current source, the gate of the first MOS transistor being connected to a signal input line, and the current capacity of the second MOS transistor being set larger than the current capacity of the first MOS transistor.

The wave detection circuit of the third aspect of the present invention is preferably provided with a differential amplifier in addition to the above configuration, one input of the differential amplifier being connected to the node between the node between the drain and the gate of the first MOS transistor and the current source, the other input being connected to the node between the node of the drain and gate of the second MOS transistor and the current source.

According to the wave detection circuit of the third aspect of the present invention, when there is no signal, i.e., there is no RF signal input, the same bias current is supplied from the current source to the first and second MOS transistors, but since the current capacity of the second MOS transistor is set larger than the current capacity of the first MOS transistor, due to the difference in the current capacities, the relationship between the voltage $V_1$ of the node between the current source and the node of the gate and drain of the first MOS transistor and the voltage $V_2$ of the node between the current source and the node between the gate and drain of the second MOS transistor becomes $V_1 > V_2$.

If an RF signal is input to the wave detection circuit in this state, the output current becomes greatly distorted due to the nonlinear characteristic of the MOS, but the DC voltage of the node between the current source and node of the gate and drain of the first MOS transistor drops so that the mean value matches with the above-mentioned bias current. That is, the operating point drops.

Further, when an RF input amplitude giving $V_1 < V_2$ is given, the output level of the differential amplifier provided at the output stage inverts and the change in current is taken out as the change in voltage.

According to another embodiment of the third aspect of the invention, there is provided a wave detection circuit provided with a MOS transistor, a current source connected to the drain of the MOS transistor, and a bias voltage generating means for supplying a predetermined bias voltage to the gate of the MOS transistor, the gate of the MOS transistor being connected to the signal input line, whereby a wave detection stage is constituted.

The wave detection circuit of this other embodiment of the third aspect of the invention preferably has a bias voltage generating means comprised of a MOS transistor with a drain and source connected together and with a node of the same connected to a current source, a capacitor connected between the gate and source of the MOS transistor, and a resistance element connected between the MOS transistor and the gate of the MOS transistor of the wave detection stage.

The wave detection circuit of this other embodiment of the third aspect of the invention preferably is provided with an inverter in addition to the above configuration, the input of the inverter being connected to the node between the drain of the MOS transistor and the current source.

According to this other embodiment of third aspect of the present invention, when there is no signal, i.e, there is no RF signal input, the voltage $V_d$ of the node between the current source and the drain of the MOS transistor is substantially equal to the power source voltage $V_{DD}$ due to the difference of current between the current supplied from the current source and the current $I_d$ flowing in the MOS transistor.

If an RF signal is input to the wave detection circuit in this state, the gate voltage $V_g$ of the MOS transistor becomes a predetermined value.

Further, the mean potential of the gate voltage $V_g$ remains as the bias voltage, but if the current $I_d$ of the MOS transistor is averaged, it increases from the current $I_d$ of the time of no signal due to the nonlinear characteristics of the MOS.

When the mean current of the current $I_d$ of the MOS transistor becomes greater than the current capacity of the current source, due to the differential current, the voltage $V_d$ of the node of the current source and the drain of the MOS transistor drops and becomes substantially the same level as $V_{ss}$.

The change in the voltage $V_d$ at the node is passed through the inverter provided at the output stage and then taken out.

BRIEF DESCRIPTION OF THE DRAWINGS

These and further objects and features of the present invention will be more apparent from the following description of the preferred embodiments given with reference to the accompanying drawings, wherein:

FIG. 10 is a table of the results of computation of the DC bias drop dV of the circuit of FIG. 9;

FIG. 14 is a table of the results of computation of the relationship of the input amplitude and current ratio of the circuit of FIG. 13.

DESCRIPTION OF THE PREFERRED EMBODIMENTS

The preferred embodiments of the present invention will now be explained with reference to the drawings.

Figure 1:
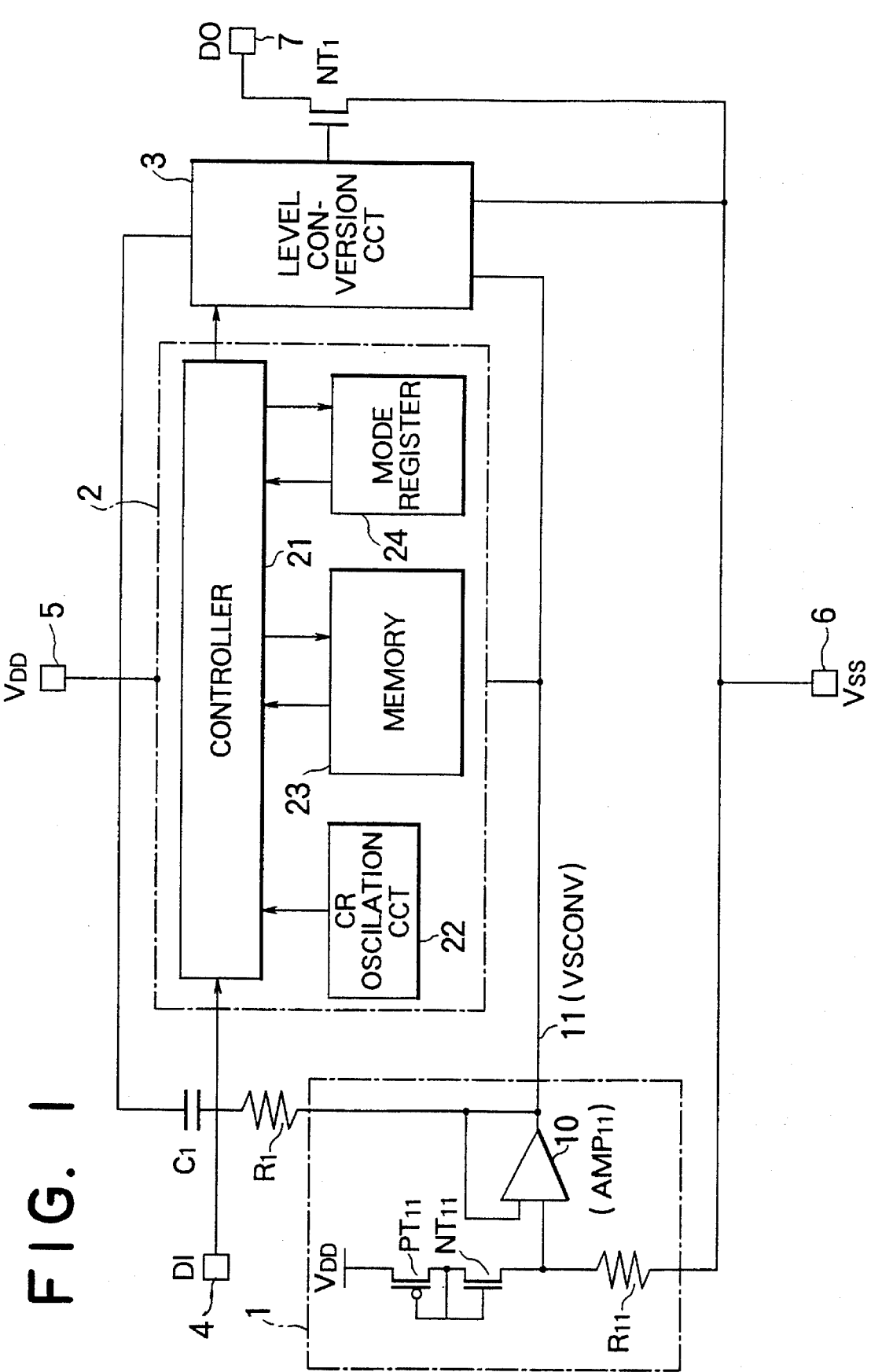
FIG. 1 is a view of an IC card LSI using a voltage drop circuit according to the first aspect of the present invention.

FIG. 1 is a view of an IC card LSI using a voltage drop circuit according to first aspect of the present invention.

In the figure, I represents a voltage drop circuit, 2 represents a low voltage drive circuit functioning as a logic circuit, 3 represents a level conversion circuit, $NT_1$ represents an output transistor, 4 (DI) represents an input end, 7 (DO) represents an output end, 5 ($V_{DD}$) and 6 ($V_{ss}$) represent power source voltages, $R_1$ represents a resistance element, and $C_1$ represents a capacitor.

The voltage drop circuit 1 is comprised of a p-channel MOS transistor $PT_{11}$, an n-channel MOS transistor $NT_{11}$, a resistance element $R_{11}$, and a differential amplifier ($AMP_{11}$) 10. These elements are connected as follows:

That is, the source of the p-channel MOS transistor $PT_{11}$ is connected to the power source voltage ($V_{DD}$) 5 and the drain is connected to the gate and connected to the drain of the n-channel MOS transistor $NT_{11}$.

Further, the node of the drain and gate of the p-channel MOS transistor $PT_{11}$ is connected to the gate of the n-channel MOS transistor $NT_{11}$. The source of the n-channel MOS transistor $NT_{11}$ is connected through the resistance element $R_{11}$ to the power source voltage ($V_{ss}$) 6. These nodes are connected to one input of the differential amplifier ($AMP_{11}$) 10.

The other input of the differential amplifier ($AMP_{11}$) 10 is connected to the output. The node of the two is connected to one end of the resistance element $R_1$.

Further, the output of the differential amplifier ($AMP_{11}$) 10 is connected to the ground terminal of the low voltage drive circuit 2 and is connected to one input terminal of the level conversion circuit 3.

In this way, in the voltage drop circuit 1, a CMOS circuit is comprised by the p-channel MOS transistor $PT_{11}$ and the n-channel MOS transistor $NT_{11}$. These MOS transistors $PT_{11}$ and $NT_{11}$ and the resistance element $R_{11}$ constitute a reference voltage generating circuit.

The reference voltage generating circuit reduces the power source voltage $V_{DD}$ (for example, 3 V) by the sum of the threshold voltage $V_{TP}$ of the p-channel MOS transistor $PT_{11}$ and the threshold voltage $V_{TN}$ of the n-channel MOS transistor $NT_{11}$ and supplies the result to one input of the differential amplifier ($AMP_{11}$) 10.

Accordingly, the output signal VSCONV of the differential amplifier ($AMP_{11}$) 10 becomes the level shown by the following equation:

$$VSCONV = V_{DD} - (V_{TN} + |V_{TP}|)$$

Figure 2A:
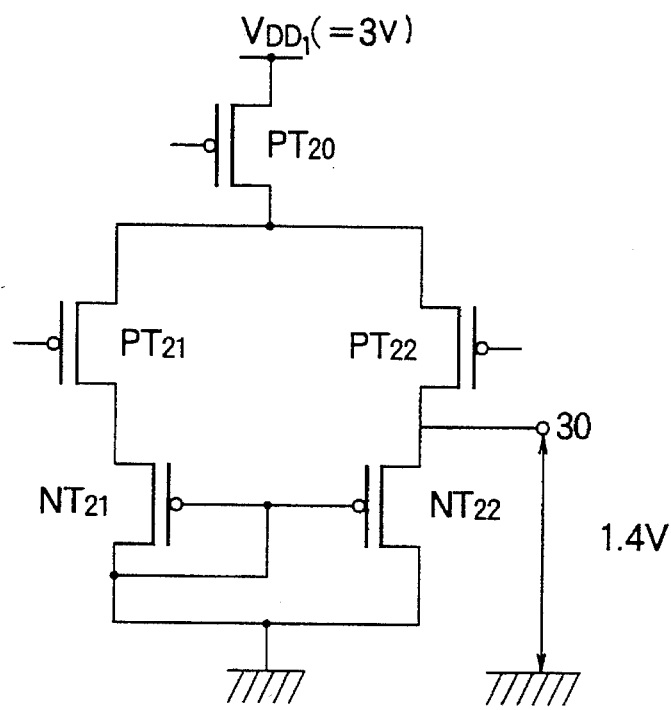
FIGS. 2A and 2B are views for explaining examples of the optimal configuration of a differential amplifier in the voltage drop circuit of FIG. 1.
Figure 2B:
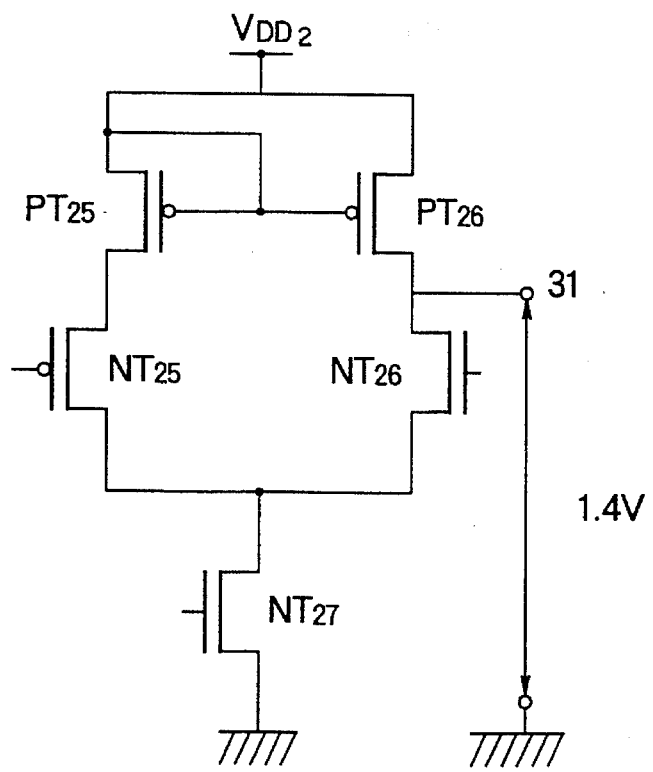

In actuality, when MOS transistors are used to constitute a differential amplifier ($AMP_{11}$) 10, it is possible to construct two types of differential amplifiers of a p-channel input as shown in FIG. 2A and an n-channel input as shown in FIG. 2B.

In the case of this embodiment, the output voltage 31 is from 1.4 V to 1.6 V, but in the n-channel input structure shown in FIG. 2B, since there are two transistors, more specifically, two series-connected stages, between the output and the power source voltage line $V_{ss}$, it is difficult to turn on the two series-connected stages of transistors by this voltage.

As opposed to this, in the p-channel input structure shown in FIG. 2A, there is only one transistor between the output and the $V_{ss}$, so the on state can be held.

Accordingly, it is preferable to use a p-channel MOS transistor at the input stage of the differential amplifier ($AMP_{11}$) 10.

Further, the size of the p-channel MOS transistor $PT_{11}$ and the n-channel MOS transistor $NT_{11}$ in the reference voltage generating circuit is determined for example as follows in the case where the threshold voltages $V_{TP}$ and $V_{TN}$ of the two transistors $PT_{11}$ and $NT_{11}$ are an equal $V_{TN}$ (for example, 0.8 V).

That is, if the drain current in the construction of FIG. 1 is the current $I_D$ (for example, 0.1 μA) and the gate voltage is the voltage $V_G$, the relationship shown in the following equation is derived:

$$I_D = \frac{1}{2} \cdot \beta (V_G - V_{TH})^2$$

Accordingly, $$V_D = V_G = V_{TH} + (2 \cdot I_D/\beta)$$

This equation is of the form of $V_D = V_{TH} + x$. The value of x changes depending on the value of β.

Now, if x=50 mV so as to make the reference voltage 2 · $V_{TH}$+0.1 V (1.7 V), W/L=4 is obtained in the case of the p-channel and W/L=2 is obtained in the case of the n-channel, so the size W/L of the p-channel MOS transistor $PT_{11}$ is determined as 16 μm/4 μm and the size W/L of the n-channel MOS transistor $NT_{11}$ as 6 μm/4 μm.

The other end of the resistance element $R_1$ connected at one end to the output of the voltage drop circuit 1 is connected to one electrode of the capacitor $C_1$. The other electrode of the capacitor $C_1$ is connected to the power source voltage $V_{DD}$.

The node between the other end of the resistance element $R_1$ and the one electrode of the capacitor $C_1$ is connected to the input end (DI) 4 and the input end of the low voltage drive circuit 2.

The low voltage drive circuit 2 is comprised of a controller 21, a CR oscillation circuit 22, and for example a 26 byte memory 23 and mode register The low voltage drive circuit 2 basically operates by the controller 21 reading out predetermined information from a predetermined address in the memory in accordance with an input signal (inquiry signal) based on the reference signal of the CR oscillation circuit 22 and outputting the information to the level conversion circuit The low voltage drive circuit 2 is supplied with the power source voltage ($V_{DD}$) 5. Further, its ground terminal is connected to the output of the voltage drop circuit 1 and receives as input the signal VSCONV, so in actuality the circuit receives the following as the power source voltage:

$$V_{DD} - VSCONV = (V_{TN} + |V_{TP}|)$$

As explained above, if the power source voltage ($V_{DD}$) 5 is made 3.0 V and $V_{TN}$ and $|V_{TP}|$ are made 0.8 V, then the low voltage drive circuit 2 operates in the low voltage region of 1.6 V.

Figure 3:
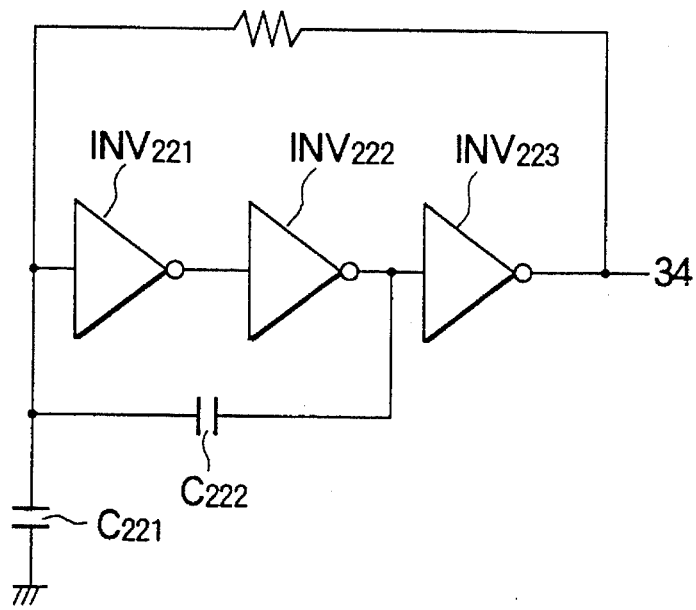
FIG. 3 is a view of an example of the configuration of an inverter type oscillation circuit according to the second aspect of the present invention.

Note that the CR oscillation circuit 22 in this embodiment, as shown in FIG. 3, is comprised of a so-called inverter type CR oscillation circuit which series connects three CMOS inverters $INV_{221}$ to $INV_{223}$.

Between the input of the first inverter $INV_{221}$ and the ground is connected a capacitor $C_{221}$. Between the node between the two and the node of the output of the next inverter $INV_{222}$ and the input of the final inverter $INV_{223}$ is connected a capacitor $C_{222}$. Between the input of the first inverter $INV_{221}$ and the output of the final inverter $INV_{223}$ is connected a resistance element $R_{222}$.

Figure 4:
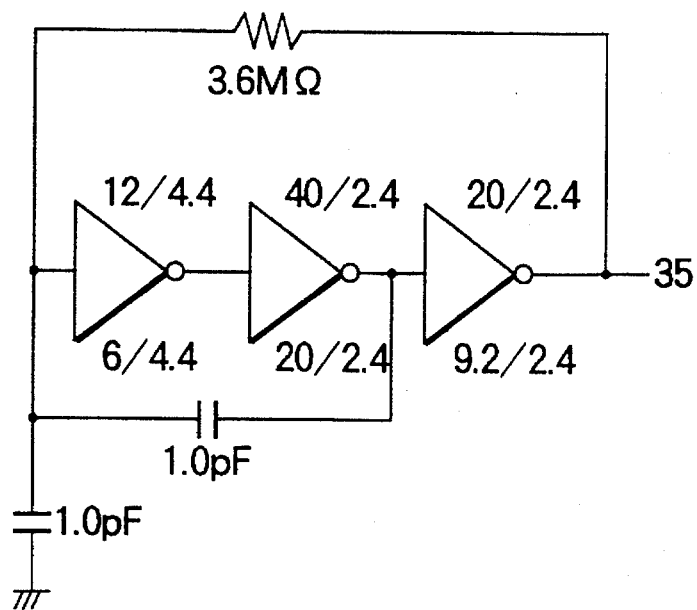
FIG. 4 is a view for explaining the optimal size etc. of the elements of the inverter type oscillation circuit of FIG. 3.

The circuit constants of the inverter type CR oscillation circuit 22 are for example set to the values shown in FIG. 4.

The input waveform of the first inverter $INV_{221}$ becomes the CR charging and discharging curve, so near the threshold voltage $V_{TH}$, an extra so-called punch-through current flows for a long period. Therefore, for the purpose of reducing the transistor capacity, the channel length of the p-channel/n-channel of the first inverter $INV_{221}$ is set to 4.4 μm.

The next inverter $INV_{222}$ drives a relatively large capacity of 2 pF, so the channel width of the p-channel/n-channel is set to 40 μm/20 μm.

Further, the channel width of the p-channel/n-channel of the final inverter $INV_{223}$ is set to 20 μm/9.2 μm.

Further, the oscillation circuit period T is given by the following equation, but if the predetermined specification value, for example, 100 kHz, is substituted in it, then it is possible to obtain the time constant of CR=3.6 μs:

$$T = -4CR \cdot \ln(0.5)$$

As a realistic value satisfying this time constant CR =3.6 μs, the capacitance C of the capacitors $C_{221}$ and $C_{222}$ is set to 1 pF and the resistance value R of the resistance element $R_{221}$ is set to 3.6 MΩ.

Figure 5:
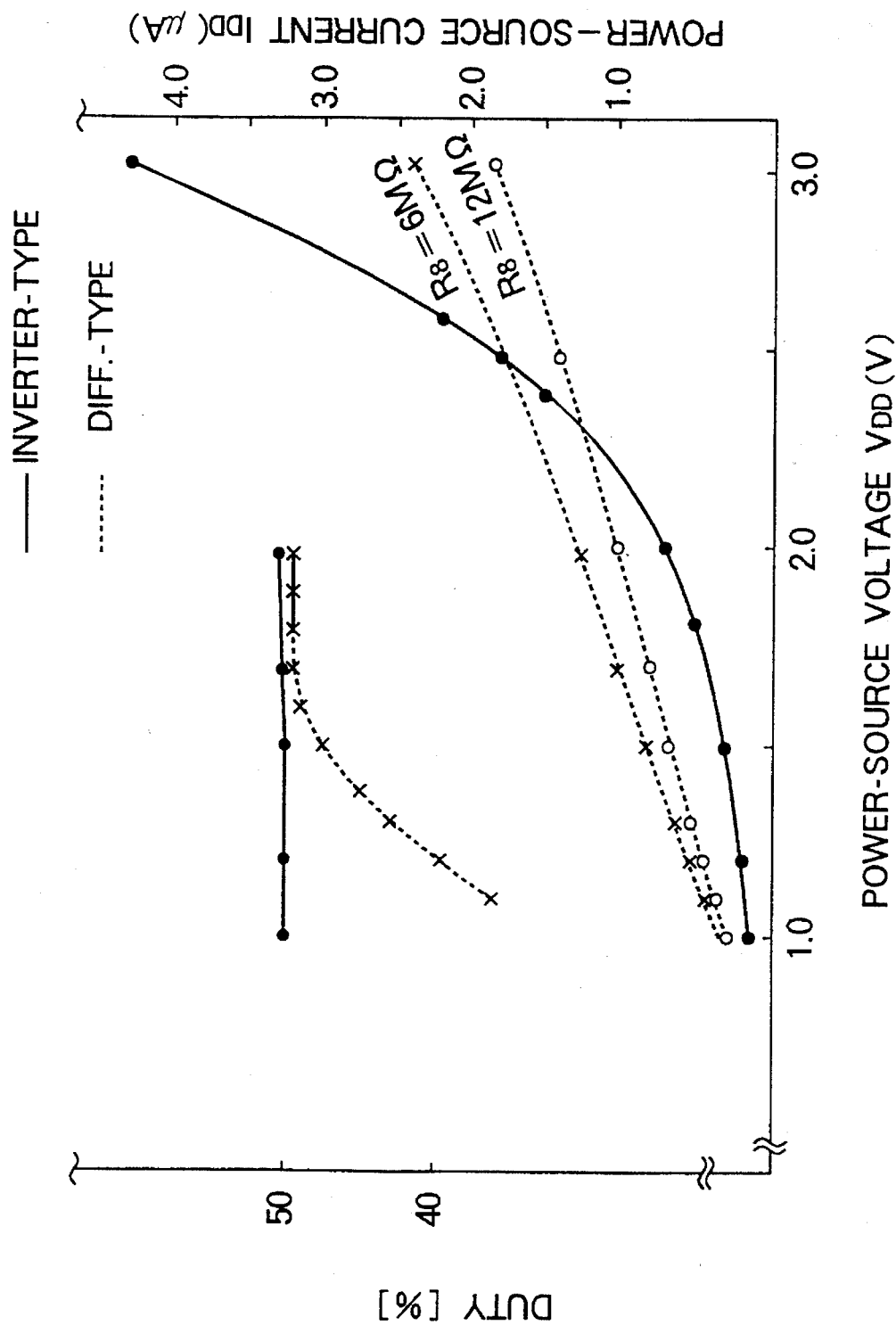
FIG. 5 is a view of the results of a SPICE simulation of the duty ratio of an inverter type CR oscillation circuit according to the second aspect of present invention shown in FIGS. 3 and 4 and a differential type CR oscillation circuit and the power source voltage dependency of the power source current.
Figure 6:
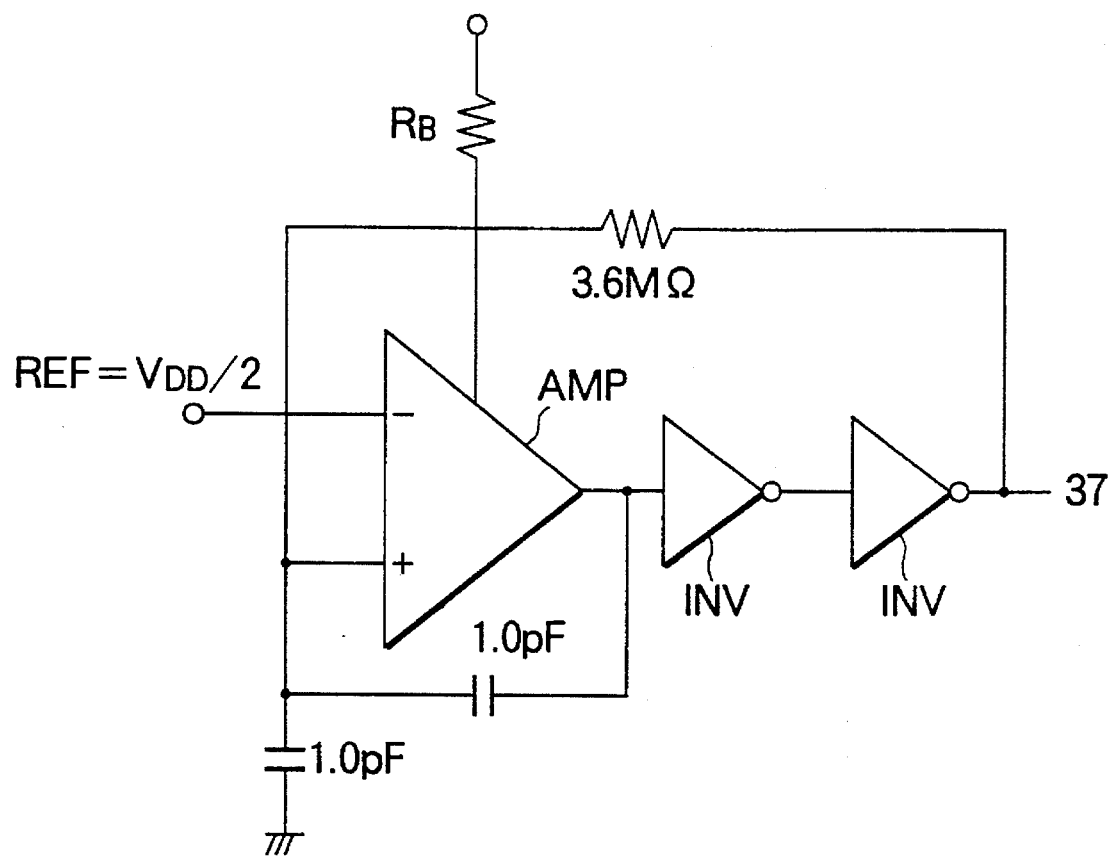
FIG. 6 is a view of an example of the configuration of a differential type CR oscillation circuit.

FIG. 5 is a view of the results of a "SPICE" simulation of the duty ratio of the inverter type CR oscillation circuit according to the second aspect of the present invention shown in FIGS. 3 and 4 and a differential type CR oscillation circuit shown in FIG. 6 and the power source voltage dependency of the power source current $I_{DD}$.

In FIG. 5, the curves shown by the solid lines show the characteristics of the inverter type CR oscillation circuit according to the second aspect of the present invention and the curves shown by the broken lines show the characteristic of the differential type CR oscillation circuit.

As will be understood from FIG. 5, the current consumption at a power source voltage of 1.6 V is 0.7 μA to 0.9 μA in the case of a differential type CR oscillation circuit, while is reduced to 0.4 μA in the case of the inverter type CR oscillation circuit according to the second aspect of the present invention.

Further, a look at the duty ratio shows that it ends up falling below 50 percent at a power source voltage of 1.6 V (2 $V_{TH}$) in the case of a differential type CR oscillation circuit, while is always 50 percent in the case of the inverter type CR oscillation circuit according to the second aspect of the present invention.

The level conversion circuit 3 returns the output signal level of the controller 21 of the low voltage drive circuit 2 to the original power source voltage $V_{DD}$ level. The output of the level conversion circuit 3 is connected to the gate of the output transistor $NT_1$. The output transistor $NT_1$ is turned on and off in accordance with the output signal of the controller 21 of the low voltage drive circuit 2.

The source of the output transistor $NT_1$ is connected to the power source voltage ($V_{ss}$) 6 and the drain is connected to the output end (DO) 7.

The size of the output transistor $NT_1$ is set to for example a W/L of 6 μm/4 μm.

Note that as the output transistor, it may be also considered to use a p-channel MOS transistor not an n-channel one, but when a p-channel MOS transistor is used, a considerably large substrate bias of 3 V is involved, so it is projected that the threshold voltage $V_{TH}$ would rise. Further, assuming that the drain voltage of the output transistor is about 1.4 V, there is the danger that the transistor will turn off. Therefore, use of an n-channel MOS transistor is preferable.

Next, an explanation will be made of the operation of the above configuration.

First, at a power source voltage ($V_{DD}$) 5 of for example 3 V, the voltage drop circuit 1 issues a low voltage signal VSCONV of $$VSCONV = V_{DD} - (V_{TN} + |V_{TP}|)$$

passing through the p-channel MOS transistor $PT_{11}$ and the n-channel MOS transistor $NT_{11}$ and further through the differential amplifier ($AMP_{11}$) 10. This is supplied to the low voltage drive circuit 2 and the level conversion circuit 3.

The low voltage drive circuit 2 is supplied with the power source voltage ($V_{DD}$) 5. Further, it receives as input at its ground terminal the output signal VSCONV of the voltage drop circuit 1.

Accordingly, in actuality, the following is applied as the operating voltage:

$$V_{DD} - VSCONV = (V_{TN} + |V_{TP}|)$$

As explained above, if the power source voltage ($V_{DD}$) is made 3.0 V and $V_{TN}$ and $|V_{TP}|$ are made 0.8 V, the low voltage drive circuit 2 operates in the low voltage region of 1.6 V.

The CR oscillation circuit 22 provided in the low voltage drive circuit 2, as mentioned earlier, can operate with ($2 \cdot V_{TH} + \alpha$), so is operated at the low voltage region of 1.6 V. A reference signal with a predetermined period is output from the CR oscillation circuit 22 to the controller.

The controller 21 receives as input an inquiry signal from for example the main apparatus through the input end (DI) 4.

The controller 21 reads out the predetermined information from a predetermined address in the memory in accordance with an input signal (inquiry signal) based on a reference signal of the CR oscillation circuit 22 and then outputs it to the level conversion circuit 3.

The level conversion circuit 3 returns the output signal level of the controller 21 of the low voltage drive circuit 2 to the original power source voltage $V_{DD}$ level. The output of the level conversion circuit 3 is supplied to the gate of the output transistor $NT_1$. The output transistor $NT_1$ turns on and off in accordance with the output signal of the controller 21 of the low voltage drive circuit 2.

By this, a predetermined response wave is sent out from the output end (DO) 7.

As explained above, according to first aspect of the present invention, since provision is made of a voltage drop circuit 1, the voltage drop is made a voltage corresponding to the sum of the threshold voltages VTH of the p-channel and n-channel MOS transistors, and this voltage is used to drive the low voltage drive circuit 2 serving as the logic circuit and comprised mainly of a CMOS circuit, it is possible to prevent the occurrence of a punch-through current and to suppress extreme reductions in speed.

Also, the voltage drop automatically changes (tracks) in accordance with the variations in the manufacturing processes such as variations in the threshold voltages $V_{TH}$ of the MOS transistors, so the circuit can be realized without the use of a costly new manufacturing processing technology, but rather by just the conventional processing technology and at a high yield and therefore a lower cost.

Further, the CR oscillation circuit is made not a differential type, but an inverter type able to be driven by double the $V_{TH}$, so it is possible to realize an oscillation circuit with a superlow current consumption of 0.5 μA.

On top of this, as mentioned earlier, by making the dropped power source voltage a double one of $V_{TH}$, even if there is manufacturing variation in the threshold voltage $V_{TH}$, the voltage drop changes following this, so stable oscillation is possible.

Further, since use is made of a simple inverter, a duty ratio of 50 percent can be realized.

Figure 7:
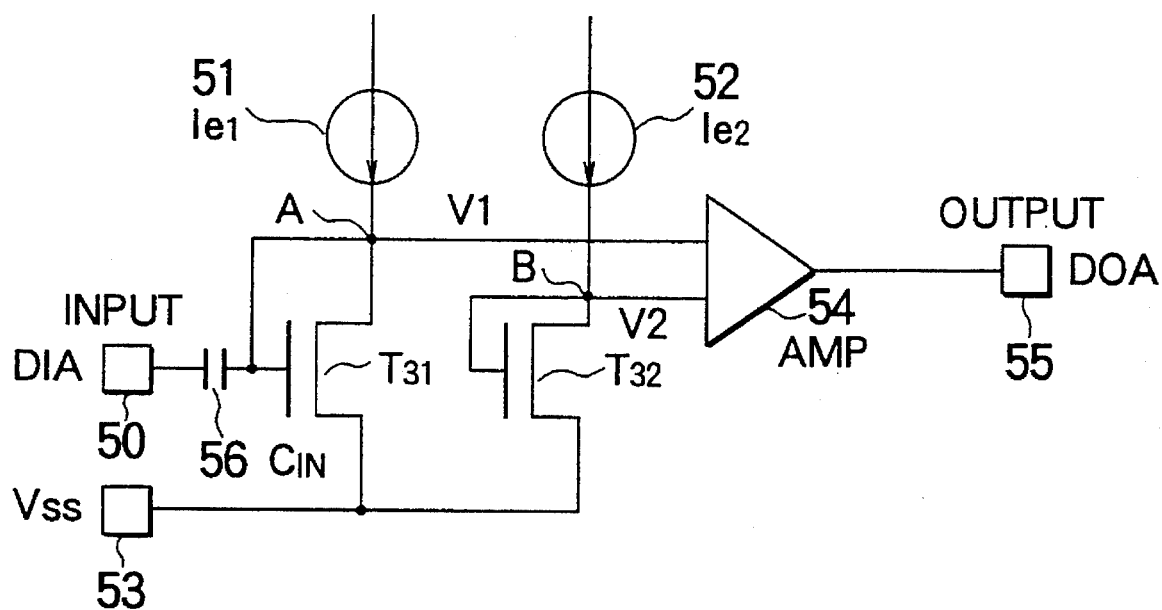
FIG. 7 is a circuit diagram of the basic configuration of a wave detection circuit according to the third aspect of the present invention.

FIG. 7 is a circuit diagram of the basic configuration of a wave detection circuit according to the third aspect of the present invention.

In FIG. 7, $T_{31}$ and $T_{32}$ denote n-channel MOS transistors, 51 and 52 denote constant current sources having identical characteristics, AMP (54) denotes a differential amplifier, $C_{IN}$ (56) denotes a capacitor, and $V_{ss}$ (53) denotes a power source voltage.

The source of the n-channel MOS transistor $T_{31}$ is connected to the power source voltage $V_{ss}$, while the gate is connected through the capacitor ($C_{IN}$) 56 to an input end (DIA) 50 and to the drain. The node of the gate and drain of the n-channel MOS transistor $T_{31}$ is connected to the constant current source 51 and one input end of the differential amplifier (AMP)

The source of the n-channel MOS transistor $T_{32}$ is connected to the constant current voltage ($V_{ss}$) 53, while the gate is connected to the drain. The node of the gate and drain is connected to the constant current source 52 and the other input end of the differential amplifier (AMP) 54.

The output of the differential amplifier (AMP) 54 is connected to the output end (DOA) 55.

In such a configuration, the current capacity of the n-channel MOS transistor $T_{32}$ is set larger than the current capacity of the n-channel MOS transistor $T_{31}$.

More specifically, the channel width of the n-channel MOS transistor $T_{32}$ is formed to be double the channel width of the n-channel MOS transistor $T_{31}$.

Figure 8A:
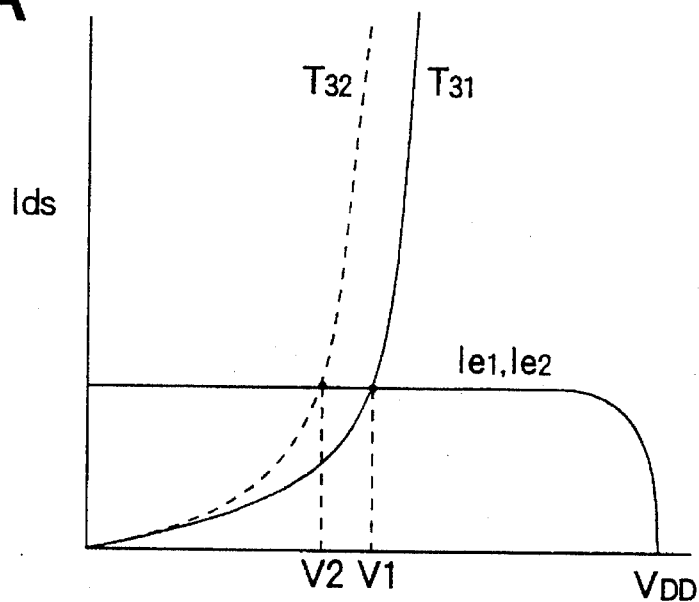
FIG. 8A and FIG. 8B are views for explaining the analysis of the operating point.

Next, an analysis will be made of the operating point in the configuration of FIG. 7 based on FIG. 8.

First, when there is no signal, i.e., there is no RF signal input, the same bias currents $I_{e1}$ are $I_{e2}$ are supplied from the constant current sources 51 and 52 to the n-channel MOS transistors $T_{31}$ and $T_{32}$, but due to the difference in the current capacities of the n-channel MOS transistors $T_{31}$ and $T_{32}$, the relationship between the voltage $V_1$ of the node A between the current source 51 and the node of the gate and drain of the n-channel MOS transistor $T_{31}$ and the voltage $V_2$ of the node B between the current source 52 and node of the gate and drain of the n-channel MOS transistor $T_{32}$ becomes $V_1 > V_2$.

That is, the input level of one input and the other input of the differential amplifier AMP satisfy the relationship of $V_1 > V_2$.

Figure 8B:
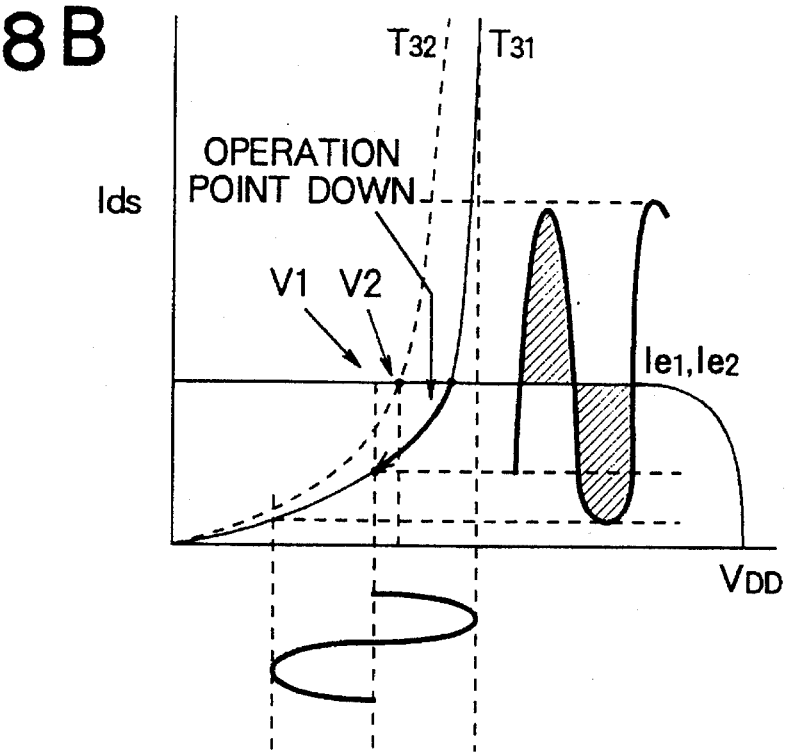

If an RF signal is input through the input end (DIA) 50 to the wave detection circuit in this state, the output current becomes greatly distorted due to the nonlinear characteristic of the MOS, but as shown in FIG. 8B, the DC voltage of the voltage $V_1$ of the node A drops so that the mean value matches with the above-mentioned bias current. That is, the operating point drops.

Further, when an RF input amplitude giving $V_1 < V_2$ is given, the output level of the differential amplifier (AMP) 54 inverts.

Figure 9:
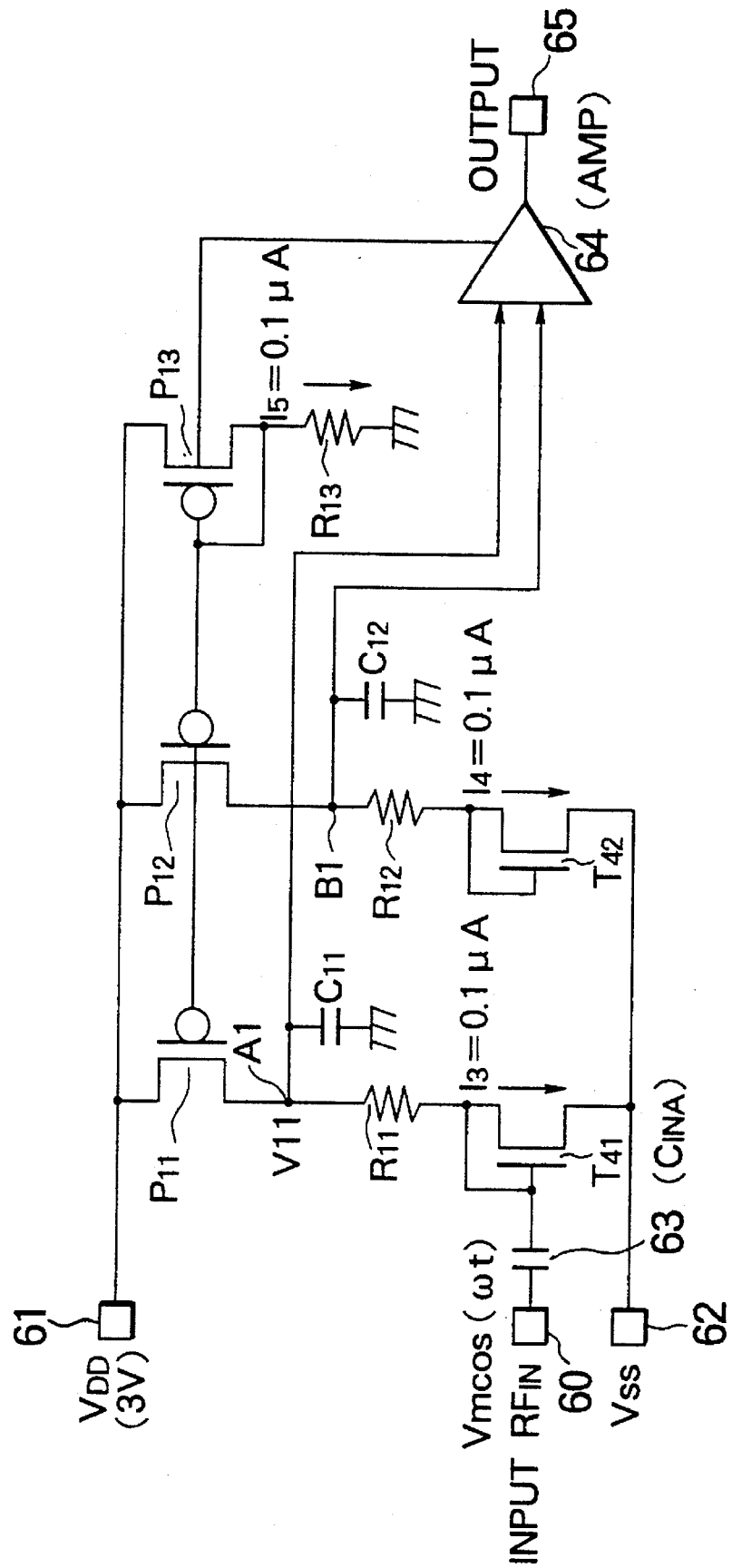
FIG. 9 is a view of an example of a specific circuit configuration of a wave detection circuit of the third aspect of the present invention.

FIG. 9 is a view of an example of a specific circuit configuration of the wave detection circuit shown in FIG. 7 according to the third aspect of the present invent ion.

That is, $T_{41}$ and $T_{42}$ represent n-channel MOS transistors, $P_{11}$, $P_{12}$, and $P_{13}$ represent p-channel MOS transistors constituting constant current sources, AMP (64) represent a differential amplifier, $C_{INA}$ (63), $C_{11}$, and $C_{12}$ represents capacitors, $R_{11}$, $R_{12}$, and $R_{13}$ are resistance elements, and $V_{DD}$ (61) and $V_{ss}$ (62) represent power source voltages.

In FIG. 9, the sources of the p-channel MOS transistors $P_{11}$ to $P_{13}$ are connected to for example the power source voltage ($V_{DD}$) 61. The bias voltage of the transistors $P_{11}$ and $P_{12}$ and the differential amplifier (AMP) 64 are generated by the drain voltage of the transistor $P_{13}$.

The drain of the p-channel MOS transistor $P_{11}$ is connected to the node A1 with one input of the differential amplifier (AMP) 64. Between the node A1 and the node of the gate and drain of the n-channel MOS transistor $T_{41}$ is connected a resistance element $R_{11}$.

Further, between the connection line of the node A1 and one input of the differential amplifier (AMP) 64 and the ground is connected the capacitor $C_{11}$.

The drain of the p-channel MOS transistor $P_{12}$ is connected to the node B1 with the other input of the differential amplifier (AMP) 64. Between the node B1 and the node of the gate and drain of the n-channel MOS transistor $T_{42}$ is connected the capacitor $C_{12}$.

The drain of the p-channel MOS transistor $P_{13}$ is connected to the gate and is grounded through the resistance element $R_{13}$.

The resistance elements $R_{11}$ and $R_{12}$ are provided to reduce the ground capacity as seen from the input, while the capacitors $C_{11}$ and $C_{12}$ are provided to aid the averaging of the drain currents of the n-channel MOS transistors $T_{41}$ and $T_{42}$.

Next, consideration will be given to the input sensitivity in the wave detection circuit according to this embodiment using FIG. 9.

Below, the minimum input amplitude will be sought.

$V_{11} = V_0 + dV + V_m \cos(\omega t) RF_{IN}$ input $V_{11} = V_0$ No signal (1)

Where, $V_0$ is the bias voltage at the time of no signal, $\{V_m \cos(\omega t)\}$ is the RF input signal, and dV is the amount of drop of the DC bias at the time of input of an $RF_{IN}$ signal.

In equation (1), when $(V_0-dV) < V_2$, the differential amplifier AMP inverts in output level.

Considering the offset of the differential amplifier AMP, a minimum of about 60 mV is necessary for the DC bias drop dv at the time of input of an $RF_{IN}$ signal.

Accordingly, the input amplitude which may result in the DC bias drop of 60 mV is defined as the minimum RF level.

However, the input stage n-channel MOS transistor $T_{41}$ is self biased near the threshold voltage $V_{TH}$, so as shown in the following equation, operates by so-called exponential characteristics in the subthreshold region of the MOS transistor.

$I = I_0 \exp(qV/nkT)$ (2)
$= I_0 \exp(V/E)(E = nkT/q)$

Where, k is Boltzmann's constant,

T is the absolute temperature, and q is the charge.

Substituting equation (1) into equation (2), the current $I_3$ at the time of no signal and the time of $RF_{IN}$ input becomes as follows:

$I_3 = I_0 \exp(V_0/E)$ No signal (3)

$I_3 = I_0 \exp((V_0 + dV + V_m \cos(\omega t))/E) RF_{IN}$ input (4)

Further, the wave detection circuit of FIG. 9 issues a dV giving a mean value of equation (4) matching with equation (3).

Accordingly, it is sufficient to find the $V_m$ giving a dV of 60 mV.

The following relationship stands from equations (3) and (4):

$$I_0 \exp(V_0/E) = I_0 \exp((V_0 + dV)/E) \cdot 1/T \int_0^T \exp(V_m \cos(\omega t)/E) dt \quad (5)$$

If the term including the integration on the right hand side of equation (5) is substituted by $f(V_m/E)$, the following relationship is obtained:

$dv = -E \times \ln(f(V_m/E))$ (6)

Here, if the substituted $f(V_m/E)$ is developed, the following is obtained:

$$f(V_m/E) = \frac{1}{T} \int_0^T \exp\left(\frac{V_m}{E} \cos\omega t\right) dt = \quad (7)$$

$$\frac{1}{T} \int_0^T \left(1 + \frac{V_m}{E}\cos\omega t + \frac{1}{2!}\left(\frac{V_m}{E}\cos\omega t\right)^2 + \right.$$

$$\left. \frac{1}{3!}\left(\frac{V_m}{E}\cos\omega t\right)^3 + \ldots + \frac{1}{n!}\left(\frac{V_m}{E}\cos\omega t\right)^n + \ldots\right) dt =$$

$$1 + \frac{1}{2!}\frac{(V_m/E)^2}{2} + \ldots + \frac{(V_m/E)^n}{n!} \cdot \frac{1}{T}\int_0^T \cos^n\omega t\, dt + \ldots =$$

$$1 + \frac{1}{2!}\frac{(V_m/E)^2}{2} + \ldots + \frac{(V_m/E)^n}{n!} \cdot \frac{(n-1)!!}{n!!} + \ldots =$$

$$1 + 0.25(V_m/E)^2 + 0.1563E-1 \cdot (V_m/E)^4 +$$

$$0.434E-3 \cdot (V_m/E)^6 + 0.677E-5 \cdot (V_m/E)^8$$

Therefore, equation (6) can be rewritten as the following equation:

$dV = -E \cdot \ln(1 + 0.25(V_m/E)^2 + 0.1563E-1 \cdot (V_m/E)^4 + 0.434E-3 \cdot (V_m/E)^6 + 0.677E-5 \cdot (V_m/E)^8 + \ldots)$ (8)

FIG. 10 is a view of the results of calculation of the DC bias drop dV when substituting suitable $V_m$ in equation (8).

As will be understood from FIG. 10, to obtain a DC bias drop of over 60 mV, an input amplitude of at least 150 mV is sufficient.

This means that the input sensitivity is improved by over 10 dB, as shown below, compared with diode wave detection, which required an input amplitude of at least $V_{TH}$ (for example, 0.7 V):

20 log (0.7/0.15)=13.4dB

Further, at the wave detection stage, the bias voltage generation stage, and the differential amplifier, currents of 0.1 µA each flow, giving a total of 0.4 µA consumption.

Accordingly, looking at the power consumption $P_D$, the power consumption is 1.2 µW with a power source voltage of 3 V. Therefore, a superlow power consumption not inferior in any way to diode wave detection can be realized.

As explained above, according to this embodiment, use is made of the nonlinear characteristic of a MOS transistor of operating by exponential characteristics when the MOS transistor is biased near the threshold voltage $V_{TH}$ and, in addition, the bias current is held low, so it is possible to realize a high frequency wave detection circuit which can detect microwaves with a low power consumption.

Accordingly, there is the advantage that it is possible to realize an IC card for reading and writing data by microwave.

Also, the wave detection stage has a fast wave detection response speed since only a slight bias voltage operates (about 100 mV) as a result of the RF input.

Figure 11:
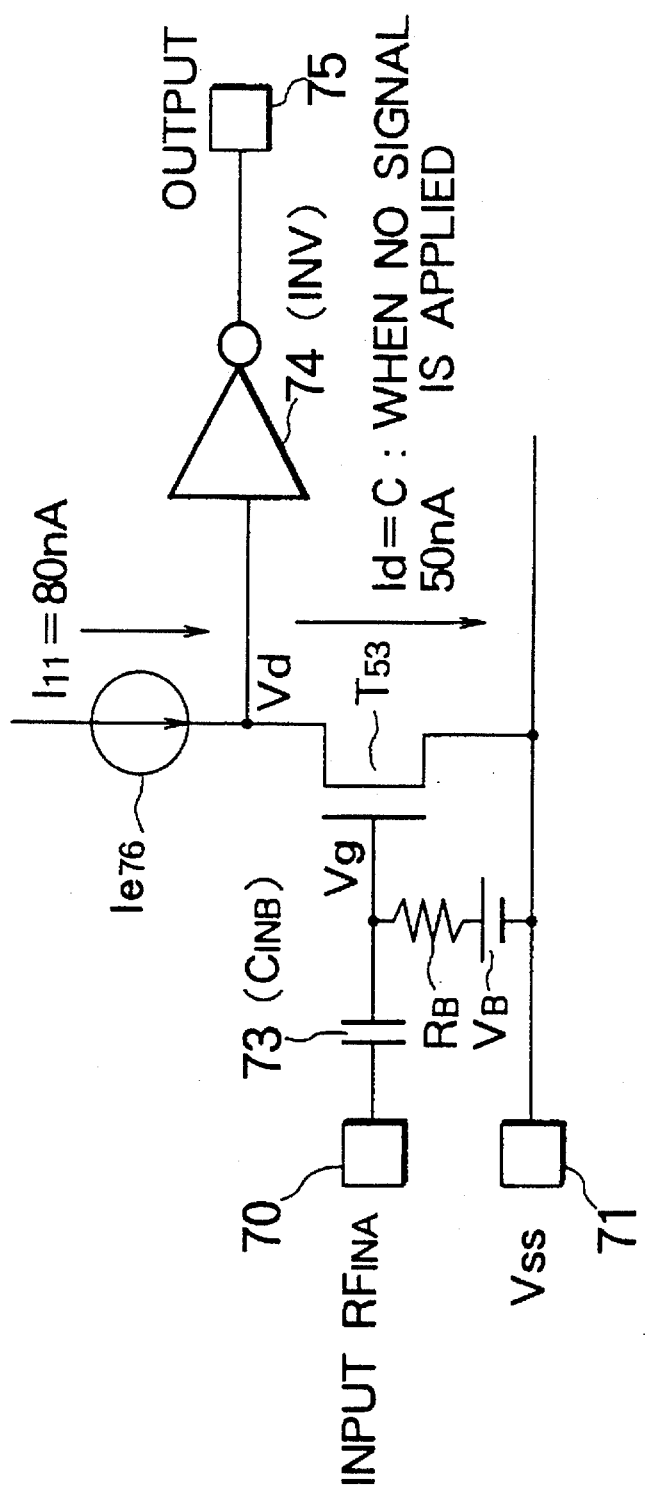
FIG. 11 is a circuit diagram of the basic configuration of a wave detection circuit according to another embodiment of the third aspect of the present invention.

FIG. 11 is a circuit diagram of the basic configuration of a wave detection circuit according to another embodiment of the third aspect of the present invention.

The point of difference of the present embodiment from the above embodiment is that in the prior embodiment, a slight input voltage was converted to a large change in current using a differential amplifier and then was converted to a change in voltage, while in this embodiment the change in current is directly detected.

In FIG. 11, $T_{53}$ denotes an n-channel MOS transistor, $I_{e11}$ (76) denotes a constant current source, AMP (74) denotes a differential amplifier, $C_{INB}$ (73) denotes a capacitor, $V_B$ denotes a constant voltage source, $R_B$ denotes a resistance element, INV (74) denotes an inverter, and $V_{ss}$ (71) denotes a power source voltage.

The source of the n-channel MOS transistor $T_{53}$ is connected to the power source voltage $(V_{ss})$ 71, while the gate is connected through the capacitor $(C_{INB})$ 73 to an input end $(RF_{INA})$ 70. The drain is connected to the constant current source $(I_{e11})$ 76 and the input end of the inverter (INV) 74.

Between the connection line of the source of the n-channel MOS transistor $T_{53}$ and power source voltage $(V_{ss})$ 71 and the gate are connected in series the constant voltage source $V_B$ and the resistance element $R_B$.

The output of the inverter INV is connected to the output end (DOB) 75.

Next, an analysis will be made of the operating point in the configuration of FIG. 11 based on FIG. 12.

Figure 12A:
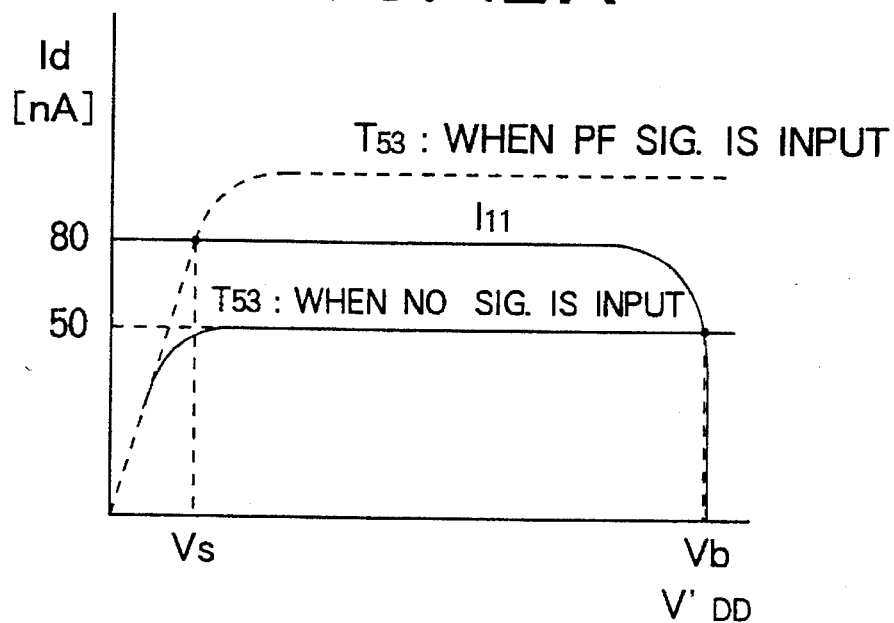
FIG. 12A and FIG. 12B are views for explaining the analysis of the operating point.

In the arrangement shown in FIG. 11, the constant current source $I_{e11}$ provides a supply current $I_{11}$ of 80 nA, and an nMOS transistor $T_{53}$ functions as a constant current element through which the current $I_d$ when no signal is supplied is 50 nA. The static characteristic thereof is shown in FIG. 12A.

First, when there is no signal, i.e., there is no RF signal input, the voltage $V_d$ of the node C between the constant current source $I_{e11}$ and the drain of the n-channel MOS transistor $T_{53}$ is kept at the power source voltage $V_{DD}$ by the difference in current (30 nA) between the current $I_{11}$ (80 nA) supplied from the constant current source $I_{e11}$ and the current $I_d$ (50 nA) flowing to the n-channel MOS transistor $T_{53}$.

If an RF signal is input through the input end $RF_{INB}$ to the wave detection circuit 1n this state, the gate voltage $V_G$ of the n-channel MOS transistor $T_{53}$ is given by the following equation:

where, $V_B$ is the bias voltage, $V_m$ is the RF amplitude, and $\{V_m \cos(\omega t)\}$ is the RF input signal.

$$V_g = V_B + V_m \cos(\omega t) \tag{9}$$

The mean potential of the gate voltage $V_g$ $$1/T - \int_0^T V_g dt, \quad t \to \infty \tag{10}$$

remains as the bias voltage $V_B$, but if the current $I_d$ of the n-channel MOS transistor $T_{53}$ is averaged, it increases from the $I_d$ at the time of no signal $I_B$ due to the nonlinear characteristic of the MOS transistor.

Figure 12B:
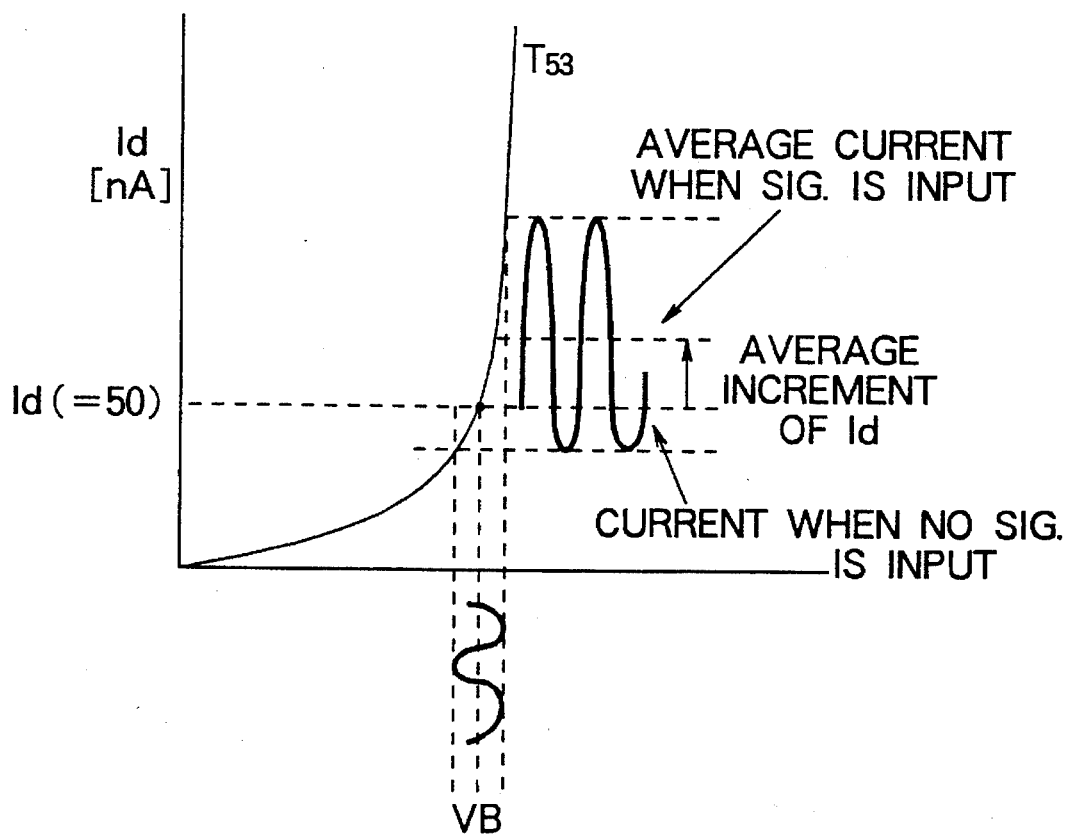

As shown in FIG. 12B, if the average current of the current $I_d$ of the n-channel MOS transistor $T_{53}$ becomes larger than the current capacity 80 nA of the constant current source $I_{e11}$, the differential current results in the voltage $V_d$ of the node between the constant current source $I_{e11}$ and the drain of the n-channel MOS transistor $T_{53}$ dropping and become the same level substantially as the power source voltage $(V_{ss})$ 71.

The change in the voltage $V_d$ of the node C is output through the inverter (INV) 74.

Figure 13:
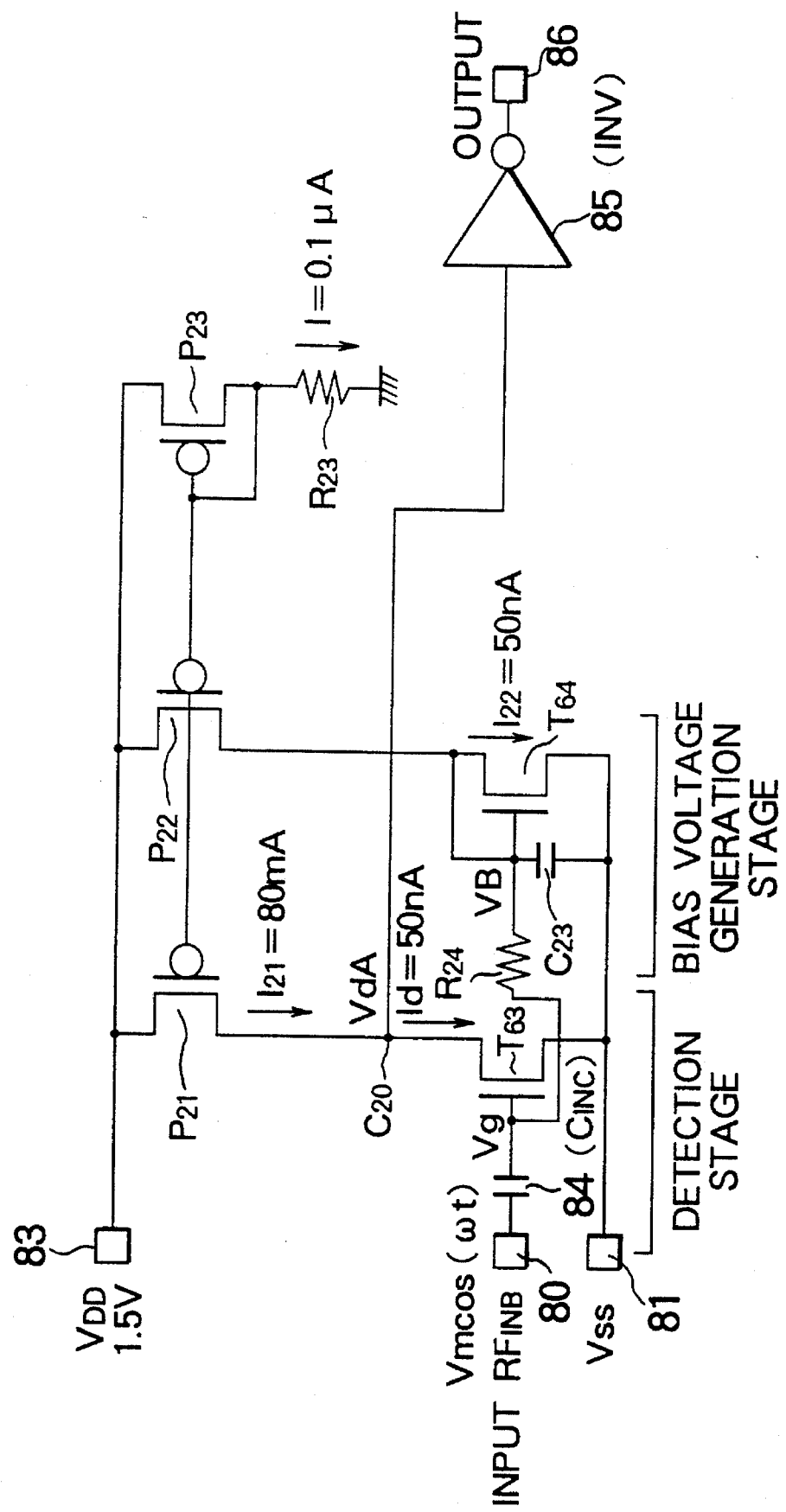
FIG. 13 is a view of an example of a specific circuit configuration of a wave detection circuit of the other embodiment of the third aspect of the present invention.

FIG. 13 is a view of an example of a specific circuit configuration of a wave detection circuit of the other embodiment of the third aspect of the present invention shown in FIG. 11.

That is, $T_{63}$ and $T_{64}$ denote n-channel MOS transistors, $P_{21}$, $P_{22}$, and $P_{23}$ denote p-channel MOS transistors constituting constant current sources, INV denotes a differential amplifier, $C_{INC}$ (84) and $C_{23}$ denote capacitors, $R_{23}$ and $R_{24}$ denote resistance elements, and $V_{DD}$ (83) and $V_{ss}$ (81) denote power source voltages.

In FIG. 13, the sources of the p-channel MOS transistors $P_{21}$ to $P_{23}$ are connected to for example the power source voltage $(V_{DD})$ 83. The gates are mutually connected. The gate of the p-channel MOS transistor $P_{23}$ is connected to the drain. The node of the same is grounded through the resistance element $R_{23}$.

The drain of the p-channel MOS transistor $P_{21}$ is connected to the drain of the n-channel MOS transistor $T_{63}$. The node C of the same is connected to the input of the inverter (INV) 85.

The drain of the p-channel MOS transistor $P_{22}$ is connected to the drain of the n-channel MOS transistor $T_{64}$.

The drain of the n-channel MOS transistor $T_{64}$ is connected to the gate. The node of the same is connected through the resistance element $R_{24}$ to the gate of the n-channel MOS transistor $T_{63}$ and is connected through the capacitor $C_{23}$ to the power source voltage $(V_{ss})$ 81. The source of the n-channel MOS transistor $T_{64}$ is connected to the power source voltage $(V_{ss})$ 81.

In FIG. 13, the n-channel MOS transistor $T_{63}$ and the p-channel MOS transistor $P_{21}$ constitute a wave detection means. The n-channel MOS transistor $T_{64}$, the p-channel MOS transistor $P_{22}$, the resistance element $R_{24}$, and the capacitor $C_{23}$ constitute the bias generating stage.

Next, consideration will be given to the input sensitivity in the wave detection circuit according to this embodiment using FIG. 13.

The input stage n-channel MOS transistor $T_{63}$ is self biased near the threshold voltage $V_{TH}$, so as shown in the following equation, operates by so-called exponential characteristics in the subthreshold region of the MOS transistor.

Accordingly, the characteristics of the n-channel MOS transistor $T_{63}$ are expressed by the following equation:

$$V_g = V_B + V_m \cos \omega t$$

where, $V_B$ is a bias voltage, and $V_m$ is a RF amplitude \hfill (11)

$$I_{dA} = I_0 \exp(qV_g/nKT) = I_0 \exp(V_g/E)$$

where, $$E = nKT/q \approx 39 \text{mV} \tag{12}$$

By substituting equation (11) in equation (12), the current $I_d$ becomes as follows:

$$I_{dA} = I_0 \exp(V_B/E) \exp(V_m \cos \omega t/E) \tag{13}$$
$$= I_b \exp(V_m \cos \omega t/E)$$

Where, $I_B$ shows the bias current at the time of no signal.

The average current $\bar{I}_{dA}$ of the current $I_{dA}$ is given by the following equation:

$$\bar{I}_{dA} = I_b - 1/T \int_0^T \exp(V_m \cos \omega t) dt \tag{14}$$

That is, $$\frac{\bar{I}_{dA}}{I_b} = 1/T - \exp(V_m \cos \omega t) dt = f(V_m/E) \tag{15}$$

If this $(I_{dA}/I_B)$ is about 2, in this example, about 100 nA, the output inverts, so as shown in the following equation, the minimum input amplitude can be learned by calculating $f(V_m/E)$.

$$\frac{\tilde{i}_{dA}}{I_b} = f(V_m/E) = \frac{1}{T}\int_0^T \exp\left(\frac{V_m}{E}\cos\omega t\right)dt = \qquad (16)$$

$$\frac{1}{T}\int_0^T 1 + \frac{V_m}{E}\cos\omega t + \frac{1}{2!}\left(\frac{V_m}{E}\cos\omega t\right)^2 +$$

$$\frac{1}{3!}\left(\frac{V_m}{E}\cos\omega t\right)^3 + \ldots \frac{1}{n!}\left(\frac{V_m}{E}\cos\omega t\right)^n + \ldots =$$

$$1 + 0 + \frac{1}{2!}\cdot\frac{V_m/E}{2} + 0 + \frac{(V_m/E)^n}{n!} \cdot \frac{1}{T}\int_0^T \cos^n\omega t\, dt =$$

$$1 + \frac{1}{2!}\cdot\frac{V_m/E}{2} + \ldots \frac{(V_m/E)^n}{n!}\cdot\frac{(n-1)!!}{n!!} + \ldots \approx$$

$$1 + 0.25\left(\frac{V_m}{E}\right)^2 + 0.1563E - 1 - \left(\frac{V_m}{E}\right)^4 +$$

$$0.434E - 3\left(\frac{V_m}{E}\right)^6 + 0.677E - 5\left(\frac{V_m}{E}\right)^8 +$$

$$0.678E - 7\left(\frac{V_m}{E}\right)^{10} + 0.471E - 9\left(\frac{V_m}{E}\right)^{12} +$$

$$0.240E - 11\left(\frac{V_m}{E}\right)^{14} + 0.938E - 14\left(\frac{V_m}{E}\right)^{16} +$$

$$0.289E - 16\left(\frac{V_m}{E}\right)^{18}$$

FIG. 14 is a view of the results of computation of the relationship between the input amplitude and the current ratio by substitution of numbers into equation (16).

As will be understood from FIG. 14, to obtain double the current ratio, $V_m$ must be about 70 mV.

This means that the input sensitivity is improved by over 20 dB, as shown below, compared with diode wave detection, which required an input amplitude of at least $V_{TH}$ (for example, 0.7 V):

20 log(0.7 V/70 mV)=20 dB

Further, at the current source, a current of 0.1 μA flows and at the wave detection stage and bias voltage generation stage, currents of 50 nA each flow, giving a total of 0.2 μA consumption.

Accordingly, looking at the power consumption PD, the power consumption is 0.3 μW with a power source voltage of 1.5 V. Therefore, a superlow power consumption not inferior in any way to diode wave detection can be realized.

As explained above, according to this embodiment, the bias current is held down low and, further, the circuit construction is made simpler without the use of a differential amplifier etc., so low voltage operation (about 1.5 V) becomes possible, high sensitivity wave detection becomes possible, of course, and it is possible to realize a wave detection circuit with a superlow power consumption of 0.3 μW.

As explained above, according to the voltage drop circuit of the first aspect of the present invention, it is possible to prevent the occurrence of a punch-through current, suppress extreme reductions in speed, and enable a high yield using even conventional processing technology and therefore, in turn, reduce costs.

Further, according to the oscillation circuit of the second aspect of the present invention, the current consumption can be reduced and a duty ratio of 50 percent can be realized.

Still further, according to the wave detection circuit of the third aspect of the present invention, it is possible to realize wave detection with a high sensitivity and a low power consumption.

Accordingly, there is the advantage that it is possible to realize an IC card which performs reading and writing of data by microwaves.

What is claim is:

1. A communication circuit system comprising:

a voltage drop circuit which comprises a complementary type transistor circuit including a p-channel transistor and an n-channel resistor connected together, said complementary type transistor circuit being connected to a power source whereby the occurrence of punch-through current is prevented;

a low voltage drive circuit means;

a resistor having a first end connected to an output of said voltage drop circuit and a second end connected to an input of said low voltage drive circuit means; and a capacitor having a first end connected to said second end of said resistor and a second end connected to said power source, wherein said voltage drop circuit generates a combined voltage corresponding to a sum of the threshold voltages of the p-channel transistor and n-channel transistor and supplies the combined voltage to said low voltage drive circuit means.

2. A communication circuit system comprising:

a voltage drop circuit which comprises:

a complementary type MOS transistor including a p-channel MOS transistor and an n-channel MOS transistor with drains and sources connected to each other;

a differential amplifier with first and second inputs and an output;

wherein one of the drains of said complementary MOS transistor is connected to a power source, while one of the sources is connected to the first input of said differential amplifier, the second input of said differential amplifier being connected to the output of said differential amplifier; and a low voltage drive circuit which comprises:

a controller circuit;

an oscillation circuit for sending a reference signal to said controller circuit; and a memory for input and output interface with said controller circuit in accordance with an input signal based on the reference signal;

a resistor having a first end connected to an output of said voltage drop circuit and a second end connected to an input of said low voltage drive circuit; and a capacitor having a first end connected to said second end of said resistor and a second end connected to said power source, wherein the low voltage drive circuit is connected between the power source and the output of said differential amplifier.

3. A communication circuit system as in claim 1, wherein said low voltage drive circuit comprises:

an oscillation circuit comprising:

a complementary MOS inverter;

a capacitor connected to an input side of said complementary MOS inverter; and a resistance element connected between the input and output of said complementary MOS inverter.

4. A communication circuit system as in claim 3, wherein said oscillation circuit operates by a voltage corresponding to a sum of respective threshold voltages of the p-channel transistor and the n-channel transistor.

5. A communication circuit system as in claim 2, wherein said oscillation circuit comprises:

first, second and third complementary MOS inverters connected together in series;

a first capacitor connected between an input side of said first complementary MOS inverter and a ground potential;

a second capacitor connected between an input side of said first complementary MOS inverter and an output of said second complementary MOS inverter; and a resistance element connected between the input of said first complementary MOS inverter and an output of said third complementary MOS inverter; and wherein a channel ratio of the p-channel and n-channel transistors constituting each complementary MOS inverter is set to a predetermined value;

wherein an output signal of said oscillation circuit has a 50% duty ratio.

6. A communication circuit system according to claim 5, wherein:

the oscillation circuit operates at a voltage lower than 1.7 V and whose total current consumption is about 0.5 μA.

7. A communication circuit system according to claim 5, wherein a p-channel length is different from an n-channel length.

8. A communication circuit system as in claim 1, wherein a width-to-length ratio of the p-channel transistor differs from the width-to-length ratio of the n-channel transistor in order to result in compatibility with CMOS inverters.

9. An oscillation circuit according to claim 4, wherein:

the oscillation circuit operates at a voltage lower than 1.7 V and whose total current consumption is about 0.5 μA.

10. A communication circuit system as in claim 2, wherein a width-to-length ratio of the p-channel transistor differs from the width-to-length ratio of the n-channel transistor in order to result in compatibility with CMOS inverters.

* * * * *